April 25, 1950     M. DACH     2,505,031
BRAKE DRUM
Filed Jan. 10, 1946     2 Sheets-Sheet 2
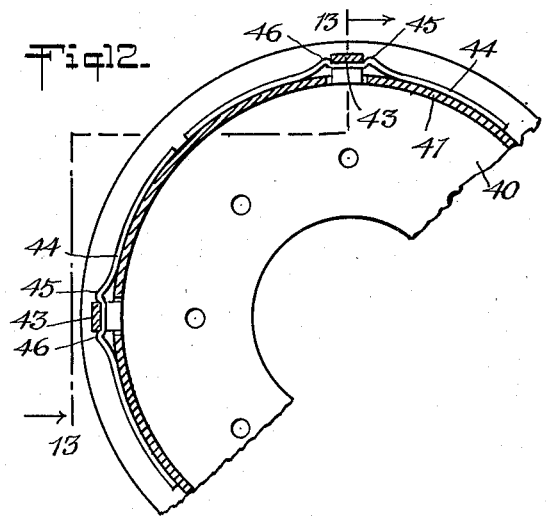
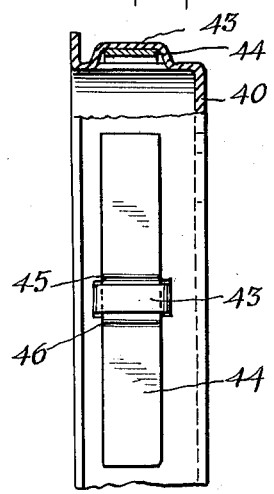
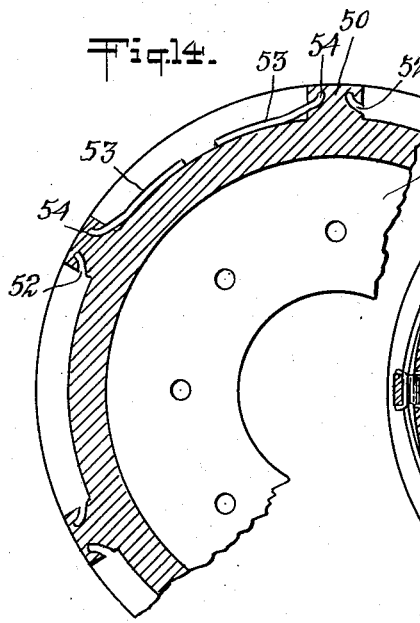
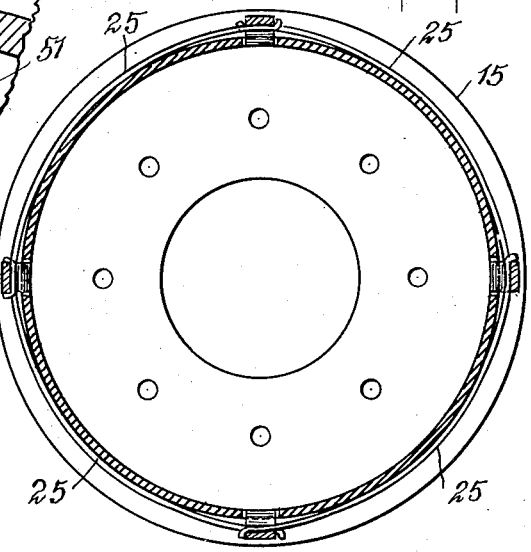
INVENTOR.
Max Dach
BY
Munn, Liddy & Glaccum
Attorneys Patented Apr. 25, 1950

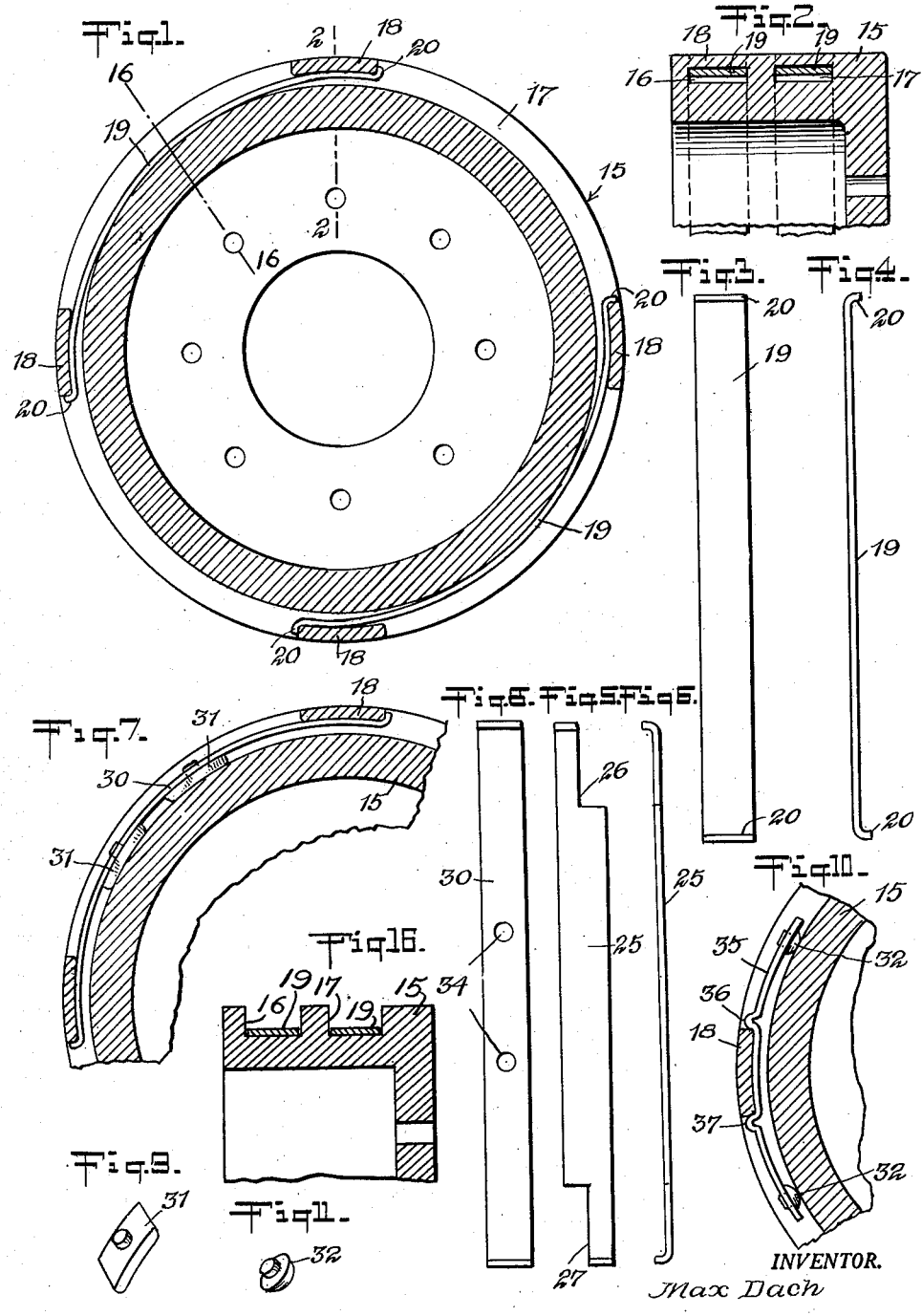

2,505,031

UNITED STATES PATENT OFFICE 2,505,031

BRAKE DRUM

Max Dach, Flushing, N. Y.

Application January 10, 1946, Serial No. 640,340

3 Claims. (Cl. 188—218)

This invention relates to brake drums, and more particularly to drums used in motor vehicles. Considerable difficulty has been experienced with vehicles such as trucks and busses due to the brakes squealing when applied. To a great degree this squealing or noise is due to vibrations set up in the brake drums which are amplified in the axle and body of the vehicle.

An object of this invention is to provide a means for dampening said vibrations before they are transmitted to the vehicle through the axle and other parts.

A further object is to provide such means and in addition to provide means for balancing the wheel and the drum to further cut down and eliminate these vibrations.

Other advantages of my invention will appear from the accompanying drawings and description.

Referring to the drawings:

Fig. 1 is a sectional elevation of a drum embodying one form of my invention.

Fig. 2 is a cross-sectional view of the same drum taken on the line 2—2 of Fig. 1.

Figs. 3 and 4 are views in front and side elevation of the dampening members used.

Figs. 5 and 6 are views showing another form of dampening member.

Fig. 7 is a sectional view showing the dampening members adapted to carry balancing weights.

Fig. 8 is a view similar to Fig. 3 but showing means for positioning the weights.

Fig. 9 shows one form of weight which may be used.

Fig. 10 is a sectional view showing a further form in place.

Fig. 11 is still another form of weight.

Fig. 12 is a further modification of my invention.

Fig. 13 is a view taken on the line 13—13 of Fig. 12.

Fig. 14 shows a further modification.

Fig. 15 shows the dampening members illustrated in Figs. 5 and 6 in place.

Fig. 16 is a cross-sectional view taken on the line 16—16 of Fig. 1.

It will be appreciated that in different installations different problems will be met. This will depend upon the size of the drums, the accuracy with which they are made and the amount of metal involved.

In Figs. 1 and 2 the drum 15 is provided with a pair of annular recesses 16 and 17. Across these recesses are positioned cross-lugs 18 and the dampening member 19 is positioned with its angular ends 20 locked in place by these cross lugs. These press the face of the member 19 against the surface of the drum and the members 19 will tend to cut down the tone vibrations set up in the brake drums. This structure permits the drum to be balanced without weakening the walls and at the same time it accomplishes the purpose of the invention.

In some instances, as shown in Fig. 16, it is desirable to have a continuous number of dampening members in which event the members shown in Figs. 5 and 6 may readily be used. The dampening member 25 has recessed ends 26 and 27 which are recessed in opposite directions. This permits a series of members 25 to form a continuous band around the drum 15 with one end 26 of one member being fastened under the same lug as the end 27 of the adjacent member.

Where it is found that a wheel is unbalanced and it is desired to weight the wheel to balance it, the dampening member 30 shown in Fig. 8 may be used. The weights 31 or 32 are inserted through the holes 34 and the dampening member 30 placed behind the lugs 18. Where a smaller dampening member is sufficient, as in Fig. 10, the dampening member 35, which is crimped at 36 and 37, may be used. There the crimps engage the lug 18 and the weights 32 are supported on the outer ends.

In Figs. 12 and 13 I have shown a drum 40 of small lighter construction in which a portion of the flange 41 is raised upwardly to form cross lugs 43 under which the crimped dampening member 44 is positioned. As shown in Fig. 12 the member is crimped at 45 and 46 so that it will be positioned under the lug 43. In Fig. 14 is shown a still further method of applying the dampening members. Section 50 of the drum 51 is undercut with a hook cut at 52 and the dampening members 53 are provided with a hooked end 54 to engage this under-cut 52 so that they will be tensioned into position.

It will be appreciated that any modifications and variations of my invention can be made to accommodate it to drums of different types and to take care of different situations.

I claim:

1. A brake drum comprising a metallic disk provided with a substantially cylindrical brake engaging flange, grooves on the outer surface of said flange, a plurality of lugs extending over said grooves and dampening members positioned in said grooves and engaging said lugs said dampening members being springy in nature so that they are flexed between said lugs and said flange.

2. A brake drum comprising a metallic disk provided with a substantially cylindrical brake engaging flange, grooves on the outer surface of said flange, a plurality of lugs extending over said grooves and dampening members positioned in said grooves and engaging said lugs, said dampening members being provided with means for positioning balancing weights on said drum.

3. A brake drum including a metallic disk having a brake engaging flange, grooves in said flange, a plurality of lugs extending over said grooves, dampening members in said grooves positioned by said lugs, said dampening members comprising a series of flat flexible strips, each of said strips being recessed at opposite sides adjacent its end whereby more than one strip may be positioned under the same lug.

MAX DACH.

REFERENCES CITED

The following references are of record in the file of this patent:

UNITED STATES PATENTS

| Number | Name | Date |
|---|---|---|
| 1,486,257 | Huck | Feb. 23, 1932 |
| 1,914,490 | Dodge | June 20, 1933 |
| 1,940,449 | Dodge | Dec. 19, 1933 |
| 2,287,984 | Glazebrook | June 30, 1942 |
| 2,288,438 | Dach | June 30, 1942 |